June 12, 1951 K. M. NEWCUM 2,556,292
MOLDED DISK REFRIGERANT DRIER FILTER UNIT
Filed July 9, 1949
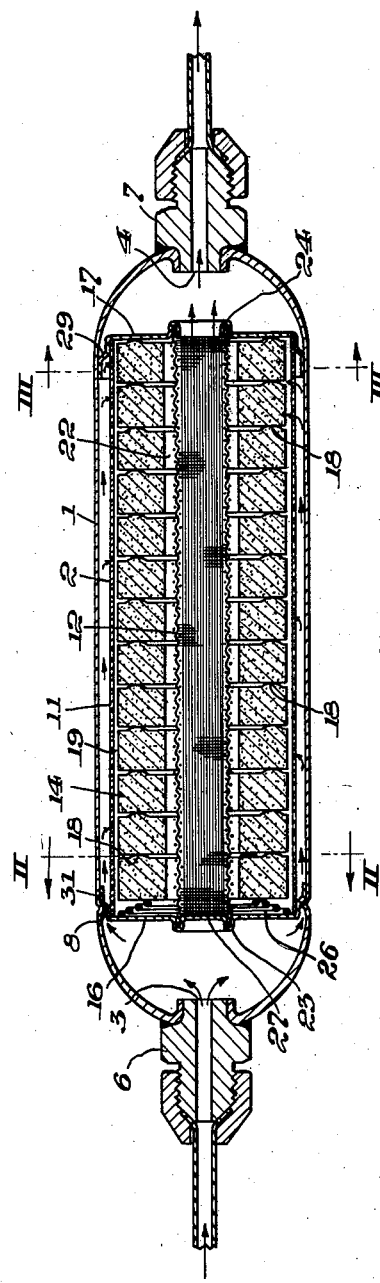
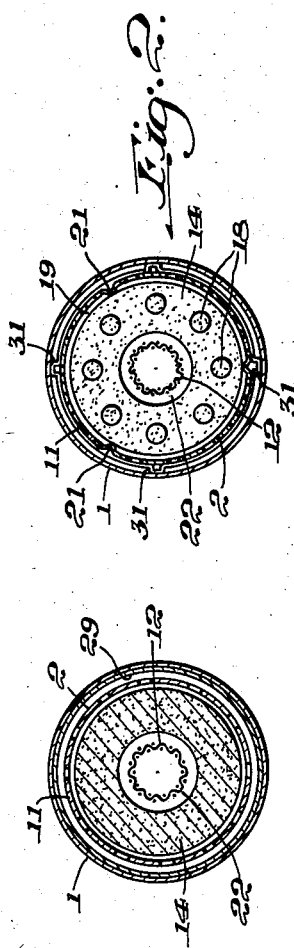
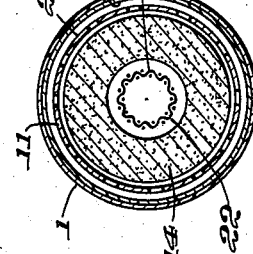
INVENTOR.
Kenneth M. Newcum
BY
Brown, Critchlow, Flick & Peckham
his ATTORNEYS.

Patented June 12, 1951

2,556,292

UNITED STATES PATENT OFFICE 2,556,292

MOLDED DISK REFRIGERANT DRIER FILTER UNIT

Kenneth M. Newcum, Zelienople, Pa., assignor to Remco, Incorporated, Zelienople, Pa., a corporation of Pennsylvania Application July 9, 1949, Serial No. 103,785

5 Claims. (Cl. 183—4.8)

This invention relates to refrigerating systems and, in particular, to units for dehydrating and filtering the refrigerants flowing through the systems.

It is well known that moisture should be removed from a refrigerating system circuit to prevent "freezing-out" at the expansion valve, as well as to avoid chemical reactions, which might form corrosive acids. Because of this, various types of drying units have been developed, most of these being elongate casings packed solidly with a granular drying agent, such as silica gel, the design of most of these being such that, in use, the refrigerant flow is longitudinally through the drying agent. As a result, a considerable resistance to refrigerant flow is set up which may result in such high line pressures that the refrigeration becomes poor. Also, such resistance causes considerable particle agitation, or roiling, which produces a fine particle dust that further checks flow, the dust, or fines, formation being heavier when small, irregular and sharp-edged granules are used as a drying agent. Still further, the most common desiccator is silica gel which is not an efficient dehydrator at temperatures such as are present on the "high" side of the system into which these units, normally, are connected, this "high" side generally designating the piping between the condenser pump outlet end and the inlet of the expansion valve.

Refrigerating systems also use filter units, not only to remove foreign particles of dirt, etc., but also to filter out the extremely fine dust formed by the roiling together of the drying material granules. For economy, such filters are combined with the drier units, but such a combination, in itself, has its disadvantages, since the fine mesh used for filtering catches the fine dust of the drying granules and increases the resistance to refrigerant flow. As a result, it often becomes necessary to clean out the filter even before there is a need for regenerating, or reactivating, the drying agent, and such frequent cleaning affords opportunity for other foreign matter to enter the system and, possibly, cause damage.

It is among the objects of this invention to provide a drier-filter unit which efficiently and rapidly removes moisture present in refrigerant fluid even at the relatively high temperature present on the "high side" of the refrigerant system, and which reduces to a minimum the resistance offered to the flow of the refrigerant through the system.

A related object is to produce a drier-filter unit in which formation of fine dust by roiling together of drying agent granules is substantially avoided so that the necessity for cleaning the unit seldom arises.

According to the invention, the unit is enclosed in an elongate casing which is provided at its end portions with refrigerant inlet and outlet openings. Within the casing are placed a pair of eccentric inner and outer perforated tubes, the perforations of the outer tube being of a mesh sufficient to remove the larger particles of dirt, etc., and the perforations of the inner tube being of a finer mesh for removing any fine dust particles which may be swept toward it. The space between these eccentric tubes is filled with a plurality of ring-shaped discs, which are arranged side by side in a spaced relationship, the spacing being achieved by forming disc projections, or beads, on one face of each disc, these beads acting to hold each disc away from its adjacent one. The discs themselves are formed of a refrigerant drying material and, it is desirable to use material that is neutral in reaction as well as inert except toward the water to be removed. Also, to provide an efficient drier for connection into the "high," as well as the "low" side, it is preferable to form these discs of a material which chemically combines with the water to form a hydrate, instead of the more usual material, such as silica gel, which simply adsorbs moisture, the reason being that these latter moisture-adsorbing materials may, and frequently do, actually give up moisture to the refrigerant when the temperature of the refrigerant is relatively high, such as during the summer months.

In addition to spacing the discs longitudinally one from the other by means of the bosses, the outer peripheries of the discs are held in a spaced relationship from the outer tube, and this may be done by forming interior ribs on the outer tube, or even by forming projections on the outer periphery of the discs. Further, the inner diameter of the disc, or in other words, the diameter of their central openings, is greater than the outer diameter of the inner perforated tube, so that, in an assembled state, the discs are spaced from the inner tube. To hold the disc in such a desired position, as well as to close the space between the ends of the concentric tubes, plates are provided which fit closely over these ends. In addition, at the inlet end of the tube a closure member, which may be integral with the plate at that end, is provided to seal off the inlet end of the inner tube and prevent flow directly into it from the inlet opening. The outer tube is held within the casing a spaced distance from its inner surface, and, further, means are employed to prevent refrigerant from flowing from this space directly into the outlet opening.

In other words, the arrangement is such that the refrigerant entering the casing must flow around the tubes and then transversely through the tubes and the drying discs.

One advantage of this arrangement is that there is little, or no, tendency for the unit to clog, since there is no roiling or rubbing together of the discs to produce the fine dust which contributes heavily to the clogging of other units, the principal means for the absence of dust formation being the use of smooth, rounded discs through which the refrigerant flows in a transverse direction. As a result, less expensive filtering elements can be effectively used in this unit and, in addition, the unit may be used until such time as it is necessary to regenerate or reactivate the drying agent.

The preferred embodiment of the invention is illustrated in the accompanying drawings of which Fig. 1 is a central longitudinal section through the unit, and Figs. 2 and 3 transverse sections along the lines II—II and III—III, respectively, of Fig. 1.

Referring to the drawings, the drier filter unit is formed of an elongate metal casing 1 in which is mounted, in a manner to be described, a drier filter cartridge 2. Preferably, the casing is formed of copper and is provided at its end portions with inlet and outlet openings 3 and 4 into which are fitted pipe coupling members 6 and 7. Also, it is desirable to form these openings by reducing the end portions with cartridge 2 already placed within the casing, this reduction, preferably, being performed by a metal spinning operation. To improve the efficiency of the unit, it is preferred to place cartridge 2 a substantial distance from both the inlet and the outlet openings, and, for this purpose, a circumferential rib 8 is formed near the inlet opening which, as shown, functions as a stop to fix the cartridge in the desired position within the casing.

Cartridge 2 is formed of several elements which include perforated, concentrically arranged, outer and inner tubes 11 and 12, refrigerant drying discs 14 arranged within the space between the tubes and specially formed end plates 16 and 17 fitted over the ends of the concentric tubes to close the space between these ends as well as hold the discs in place.

Discs 14 are formed of a dehydrated material preferably possessing the properties described above, one such material being molded anhydrous calcium sulfate which may be impregnated with a small amount of calcium dichloride to increase their absorption capacity. Further, each disc is specially formed with relation to the cartridge tubes so that the assembled discs are spaced from each other and also from both the outer and the inner tubes. To space the discs from each other, each disc is provided with a plurality of circumferentially spaced projections, or beads 18, the purpose of the spacing being to permit refrigerant to flow transversely between them. Further, between the peripheries of the discs and outer tube 11 there is left a space 19, this space being provided by the formation of a plurality of ribs 21 (Fig. 2) on the interior wall of the periphery of the tube. Another space 22 is left between the inner periphery of the discs and inner perforated tube 12, this space existing due to the fact that the inner diameter of the discs is made greater than the outer diameter of perforated tube 12.

As stated, end plates 16 and 17 are fitted onto the ends of concentric tubes 11 and 12 and, as shown, the central portions of each of these plates is crimped to form annular grooves 23 and 24 for supporting central tube 12, the ends of this tube being fitted into these grooves for this purpose. The plates close the space between the ends of tubes 11 and 12 and, also, are used to exert sufficient pressure to hold the discs in place between the tubes. However, when rather long drier-filter units are used, it is desirable to employ a coil spring 26 between one of the end plates and an end disc to exert the pressure for so holding the discs. For the purposes of this invention, it, also, is necessary to seal off the end of inner tube 12 which lies near the inlet end of the casing and this is accomplished by forming end plate 16 with a central closure 27. On the other hand, the outlet end of tube 12 remains open.

Another feature of the invention is that end plates 16 and 17 are used to hold the cartridge a spaced distance from the inner wall of casing 1. Thus, outlet end plate 17 is formed with an outwardly projecting solid flange 29 which has a cylindrical portion that presses against the inner portion of casing 1 to support this end of the cartridge. Similarly, plate 16 is provided with outwardly projecting circumferentially-spaced flanges, or spring arms, 31, each of these having cylindrical portions pressing against the casing. As seen in Fig. 2, wide openings are left between these arms, these openings permitting refrigerant to flow from the casing inlet opening into the space between the casing and the outer perforated tube.

To assemble these drier-filter units, it is preferred to first spin the inlet end of the casing to form the inlet opening. After this, interior rib 8 is formed by indenting the metal of the casing, this rib being formed at such a position that, when cartridge 2 is inserted into the casing, a substantial space is left between the inlet opening and the cartridge. The assemblage is completed by inserting the cartridge, spinning the outlet end of the casing, and then securing the pipe coupling members.

In operation, the coupling members are connected into either the "high" or "low" side of the refrigerating system. One of the principal advantages of the units is the path that refrigerant must follow in flowing through the unit. Thus, instead of the usual longitudinal flow through drying material, these units cause refrigerant to flow around plate 16 and then transversely between the drying discs into inner tube 12 from which the cleaned and dried refrigerant flows on through the refrigerating system.

In flowing through perforated outer tube 11, the larger particles of dirt, and other materials, which may have found their way into the refrigerant are removed, the diameter of these perforations being small enough to prevent their passage through it. Immediately after passing through outer tube 11, the refrigerant travels transversely through the spaced, adjacent discs 14 as well as along the length of the tube in space 19. After passing between the discs, the fluid comes into space 22 in which it again travels through inner perforated tube 12, as well as along through this space. The purpose of both space 19 and space 22 is to permit the refrigerant to spread out and equalize the transverse flow through both the drying discs and the filtering inner tube. By so equalizing the flow, the full area of the discs are used for drying and the complete surface of inner tube for filtering. Tube 12 preferably is a heavy wire mesh screen, the mesh being sufficiently fine to filter out any of the fine dust which may be swept from discs 14. However, as stated, one of the features of this invention is that a very slight amount of such fine dust is carried away from these smooth, rounded discs. As compared to prior drier units, in which granular drying agents commonly are used, the amount of dust is practically negligible and, as a result, inner tube 12 does not become clogged and the refrigerant can flow freely through this tube.

From the above description, it will be appreciated that an unusually simple, inexpensive and efficient drier filter unit is provided. The efficiency is due somewhat to the fact that refrigerant must flow transversely through drier discs so that little dust is formed. The economy of the units result from the ease of manufacture and, also, from the fact that the unit does not require special filter cloths to remove substantial amounts of drying material dust. Another advantage, in addition to those already described, is that this particular unit can be very quickly and easily cleaned and regenerated, the cleaning being accomplished simply by flushing the discs with carbon tetrachloride forced into the outlet opening and out through the inlet opening. Compared to this, it is relatively difficult to clean other units which use granular drying agents, since foreign particles may be deposited deeply in crevices of the granules so that they are reached and cleaned out with difficulty.

According to the provisions of the patent statutes, I have explained the principle, preferred embodiment and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A drier-filter unit for use in a refrigerating system comprising an elongate casing provided at one end with an inlet and at the other end with an outlet opening, concentric inner and outer perforated tubes mounted within said casing a spaced distance from said inlet opening, a plurality of longitudinally spaced-apart ring-shaped discs formed of refrigerant drying material and arranged side-by-side within the space between said tubes, means spacing the periphery of said discs from said outer tube, said discs having an inner diameter greater than the outer diameter of said inner tube for providing a space between the inner tube and the discs, and closure plates at the inlet and outlet ends of the tubes for constraining all of the refrigerant flow from the inlet opening to pass into the space between the casing and the outer tube, then transversely between the spaced-apart discs into the space between the discs and the inner tube and then on through the inner tube to the discharge opening.

2. A drier-filter unit for use in a refrigerating system comprising an elongate casing provided at one end with an inlet and at the other end with an outlet opening, concentric inner and outer perforated tubes mounted within said casing a spaced distance from said inlet opening, a plurality of longitudinally spaced-apart ring-shaped discs formed of refrigerant drying material and arranged side-by-side within the space between said tubes, means spacing the periphery of said discs from said outer tube, said discs having an inner diameter greater than the outer diameter of said inner tube for providing a space between the inner tube and the discs, closure plates at the inlet and outlet ends of the tubes for constraining all of the refrigerant flow from the inlet opening to pass into the space between the casing and the outer tube, then transversely between the spaced-apart discs into the space between the discs and the inner tube and then on through the inner tube to the discharge opening, said closure plates holding said discs in said spaced-apart relationship one against the other, and a spring compressed between one of said plates and its proximate disc.

3. A drier-filter unit for use in a refrigerating system comprising an elongate casing provided at one end with an inlet and at the other end with an outlet opening, concentric inner and outer perforated tubes mounted within said casing a spaced distance from said inlet opening, a plurality of longitudinally spaced-apart ring-shaped discs formed of refrigerant drying material and arranged side-by-side within the space between said tubes, means spacing the periphery of said discs from said outer tube, said discs having an inner diameter greater than the outer diameter of said inner tube for providing a space between the inner tube and the discs, and closure plates at the inlet and outlet ends of the tubes for constraining all of the refrigerant flow from the inlet opening to pass into the space between the casing and the outer tube, then transversely between the spaced-apart discs into the space between the discs and the inner tube and then on through the inner tube to the discharge opening, said inner tube having perforations adapted in size to entrain fine particles of dehydrating material carried to it.

4. A drier-filter unit for use in a refrigerating system comprising an elongate casing provided at one end with an inlet and at the other end with an outlet opening, concentric inner and outer perforated tubes mounted within said casing a spaced distance from said inlet opening, a plurality of longitudinally spaced-apart ring-shaped discs formed of refrigerant drying material and arranged side-by-side within the space between said tubes, means spacing the periphery of said discs from said outer tube, said discs having an inner diameter greater than the outer diameter of said inner tube for providing a space between the inner tube and the discs, and closure plates at the inlet and outlet ends of the tubes for constraining all of the refrigerant flow from the inlet opening to pass into the space between the casing and the outer tube, then transversely between the spaced-apart discs into the space between the discs and the inner tube and then on through the inner tube to the discharge opening, said inner tube having small perforations sized to entrain fine particles of drying material carried to it, and said outer tube having larger perforations sized to entrain larger particles of material which may be contained in the refrigerating system.

5. A drier-filter unit for use in a refrigerating system comprising an elongate casing provided at one end with an inlet and at the other end with an outlet opening, concentric inner and outer perforated tubes disposed within the casing, a plurality of ring-shaped discs formed of refrigerant drying material arranged side-by-side within the space between the tubes, inwardly projecting ribs formed on said outer tube and bearing against the periphery of said discs for spacing the discs from the outer tubes, said discs each having small projections formed thereon for spacing adjacent discs one from the other, said discs also having an inner diameter greater than the outer diameter of said inner tube for providing a space between the inner tube and the discs, plates closing the space between the ends of the tubes and holding said discs one against the other, a closure sealing the inlet end of said inner tube, each of said plates being provided centrally with annular grooves for receiving and supporting the ends of said inner tube and being projected radially into contact with the inner surface of the casing for holding said outer tube a spaced distance therefrom, the projected portion of the inlet end plate being apertured whereby all of the refrigerant flow from the inlet opening must pass through said apertures into said space between the casing and the outer tube and then transversely between the spaced-apart discs into the space between the discs and the inner tube from which the refrigerant passes through the inner tube and on to the discharge opening of the casing.

KENNETH M. NEWCUM.

REFERENCES CITED

The following references are of record in the file of this patent:

UNITED STATES PATENTS

| Number | Name | Date |
|---|---|---|
| 2,404,468 | Vokes et al. | July 23, 1946 |
| 2,413,769 | Kasten | Jan. 7, 1947 |

FOREIGN PATENTS

| Number | Country | Date |
|---|---|---|
| 52,589 | Netherlands | June 15, 1942 |